Figure 1:
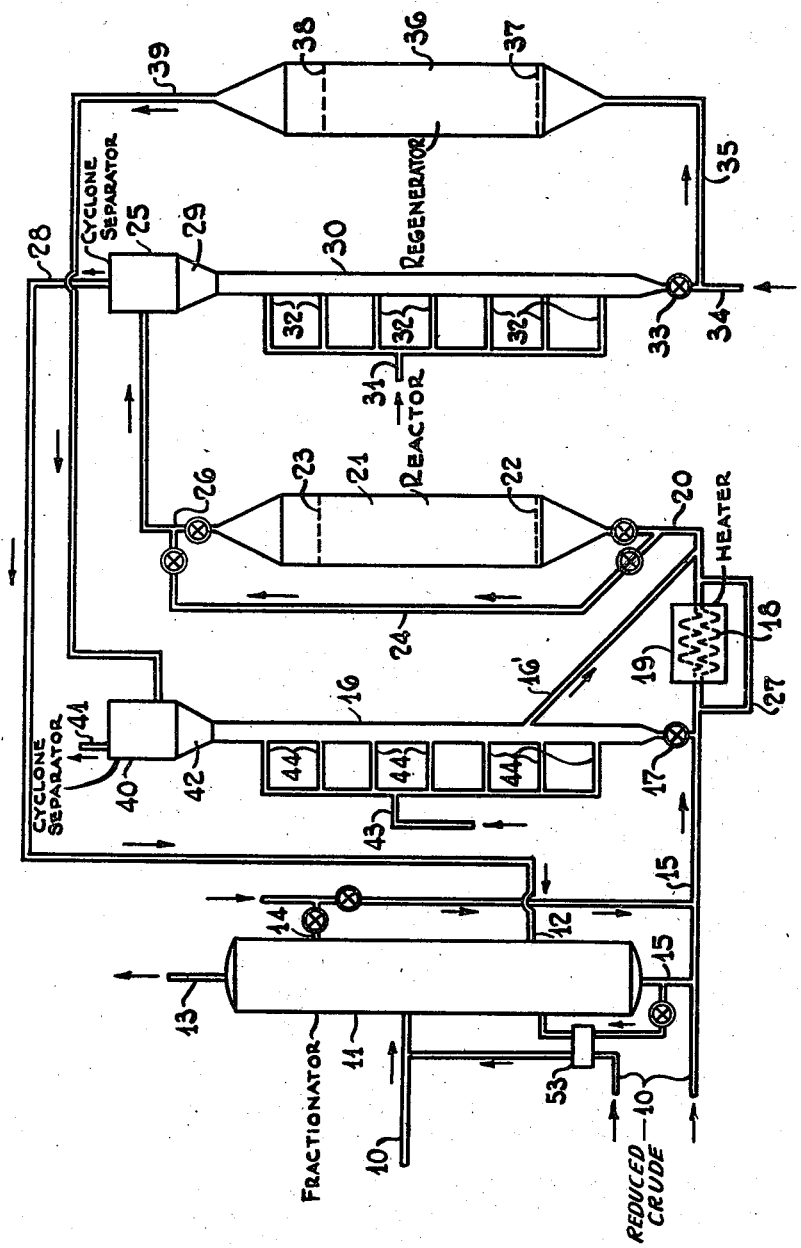

Charles E. Hemminger Inventor

Patented Aug. 12, 1947

2,425,532

UNITED STATES PATENT OFFICE 2,425,532

PROCESS FOR REMOVING INORGANIC IMPURITIES FROM MINERAL OILS PREPARATORY TO CATALYTIC CRACKING

Charles E. Hemminger, Westfield, N. J., assignor to Standard Oil Development Company, a corporation of Delaware Application May 26, 1944, Serial No. 537,414

2 Claims. (Cl. 196—52)

This invention relates to the catalytic conversion of hydrocarbons, and more particularly relates to the catalytic conversion of reduced crudes.

In the catalytic cracking of reduced crudes, the capacity of the catalytic unit is generally limited because of large coke formation on the catalyst. Furthermore, if the crude contains inorganic material such as salt, the salt deposits on the catalyst and reduces its activity.

The presence of salt or other inorganic materials also tends to increase the amount of coke formed on the catalyst. If it is attempted to remove the salt or other inorganic material, prior to introducing the reduced crude into the catalytic unit, difficulties, particularly in filtering, are encountered due to the high viscosity of the oil. It is therefore the main object of this invention to decrease the coke formation on the catalyst when cracking reduced crude.

It is also another object of this invention to improve the handling of residual oil-catalyst slurries in a fluid catalyst cracking process.

These and other objects of this invention are attained by introducing the reduced crude or other residual oil into the cracked product fractionator whereby the viscosity of the residual is reduced and the vaporization of the vaporizable constituents in the residual is facilitated by the heat contained in the cracked vapors. Furthermore, the product and viscosity of the residual facilitates desalting prior to the introduction of the residual into the catalytic cracking unit.

According to this invention, the reduced crude is fed into the middle of the product fractionator. If desired, all or part of the gasoline in the reduced crude or other residual fed to the product fractionator may be included in the feed to the fractionator. In this case the hot vapors of the cracked products will cause the lighter fractions in the residual feed to be distilled overhead. The residual introduced into the product fractionator may be advantageously preheated by heat exchange and subjected to a distillation in a separate column to remove virgin gasoline and gas oil, if it is desired to treat them separately from the residual.

In any case, the residual oil is introduced into the product fractionator and is mixed with cracked vapors introduced near the bottom of the product fractionator. The cracked vapors usually contain a small amount of catalyst fines which have not been removed in the catalytic unit. The heat contained in the cracked vapors introduced into the bottom of the tower causes the gas oil, gasoline and lighter fractions to be removed as vapors, while the reflux condensate and reduced crude may be removed from the bottom of the tower. The reflux condensate acts as a diluent to reduce the viscosity of the reduced crude thus removed and enables the oil-catalyst slurry to be handled easily. The total mixture thus removed from the bottom of the tower plus the catalyst fines may be fed through necessary coolers or heat exchangers to a fluid catalyst reactor. If desired, a light gas oil side stream from the product fractionator may be combined with the bottoms fraction prior to its introduction into the catalytic unit. If the reduced crude or other residual introduced into the product fractionator contains appreciable amounts of inorganic material, such as salts, it is desirable to remove a mixture of reduced crude and reflux condensate from a tray above the entrance of the cracked vapors so that only heavy tar passes out of the bottom of the fractionator and the catalyst contained therein separated and mixed with fresh feed to the reactor while recycle gas oil is passed directly into the reactor. The reduced crude and reflux condensate mixture containing the inorganic material is removed from the side of the tower near the bottom but above the inlet of the cracked vapors and fed to a desalting unit where the mixture is filtered to remove these inorganic materials. Lower filtering temperatures may be used in the desalting unit, since the reflux condensate in the reduced crude reduces its viscosity with the result that filtering equipment is subjected to much less use. Furthermore, the desalting operation is facilitated by the absence of naphthenic esters which have been broken up in the fractionator. After filtering, the reduced crude is fed to the fluid catalyst unit with or without the addition of other streams of gas oil, such as gas oil from the bottom of the tower, light residue gas oil, and virgin gas oil. In this manner, the coke formation and gas per unit of gasoline produced from the reduced crude is reduced due to the presence of reflux condensate.

Figure 2:
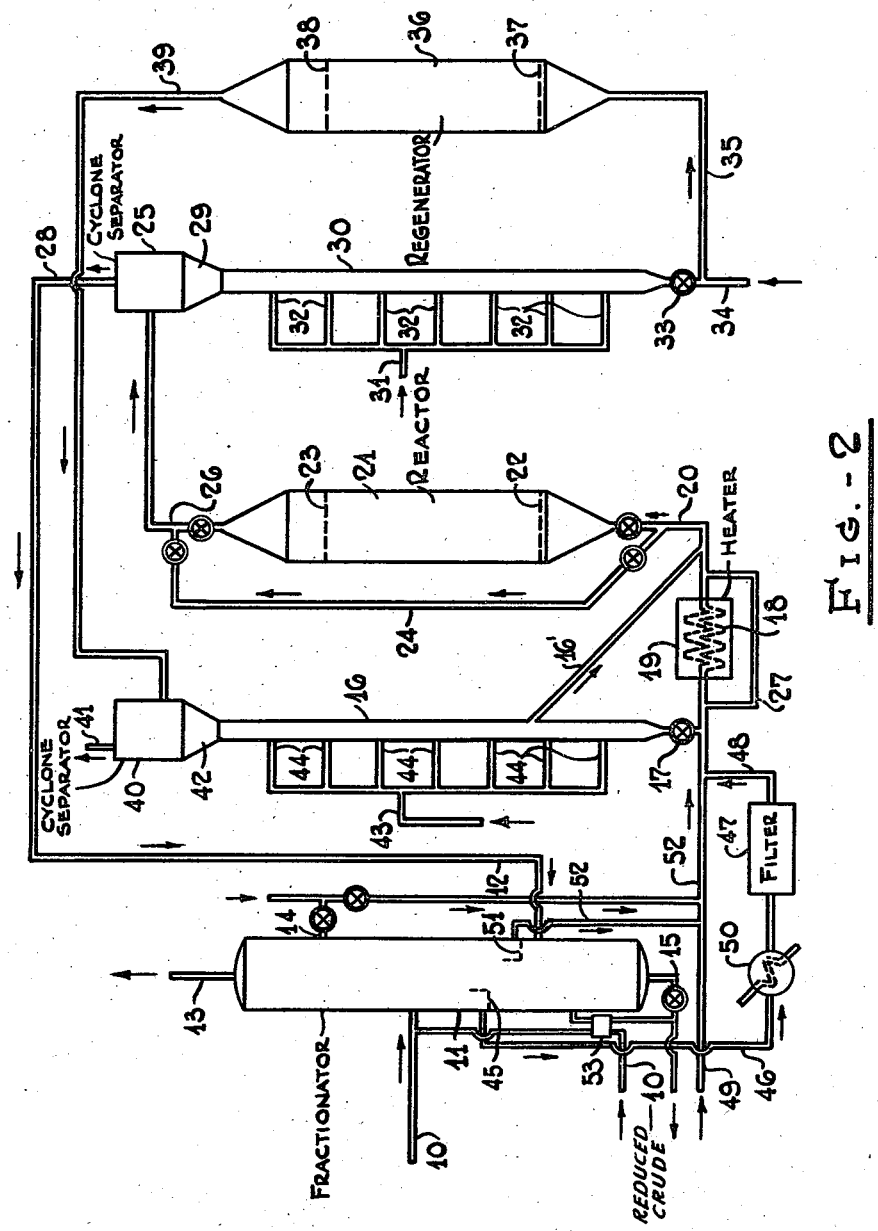

In the drawings, Figure 1 represents one form of apparatus which may be used in carrying out the invention wherein the residual entering the fractionator contains no salts or other inorganic material; and Figure 2 represents another form of apparatus which is used in carrying out the invention when the residual oil contains such inorganic material.

Referring to Figure 1, reference character 10 represents a line for introducing reduced crude or other residual into the product fractionator 11. Reference character 12 designates a line for introducing cracked vapors into product fractionator 11 near the bottom thereof. The heat contained in the cracked vapors introduced through line 12 is sufficient to cause gasoline, light gas oil and other light vapors to be removed overhead from fractionator 11, gas and gasoline being withdrawn through line 13 and light gas oil through line 14.

Reflux condensate and unvaporized material contained in the residual introduced into the tower through line 10 are removed from the bottom of the tower through line 15 and mixed with regenerated catalyst from standpipe 16 which contains regenerated catalyst from the cracking step described below. A portion of this residual may be passed through heat exchanger 53 for heating incoming reduced crude in line 10. Standpipe 16 is provided with control valve 17 at its lower end to control the amount of catalyst being mixed with the bottoms fraction from fractionator 11.

A mixture of residual oil and powdered catalyst is preferably passed through heating coil 18 in heating zone 19 to vaporize at least a portion of the oil. The mixture of partly converted oil and powdered catalyst is then passed through line 20 and introduced into reaction chamber 21 provided with grid 22 wherein the catalyst is in a fluidized mass having a level 23. The grid member 22 functions to distribute evenly the powdered catalyst in the oil vapors across the cross-sectional area of the reaction zone 21. The diameter of the zone 21 is much greater than the diameter of the inlet pipe 20 and due to this large diameter there is a decrease in the velocity of the vapors passing upwardly through reaction zone 21. The velocity of the vapors passing upwardly through reaction zone 21 is so selected that the mixture of powdered catalyst and oil vapors in reaction zone 21 assume many of the characteristics of a liquid and form a fluidized mixture having a level 23 similar to the level of a liquid. Within this reaction zone 21 the hydrocarbon vapors are converted catalytically to motor fuel constituents.

Instead of the reaction zone 21, the heating coil 18 may serve as the reaction zone and the vapors from the reaction products and powdered catalyst as a dry mixture may be passed through line 24 to separating means 25.

Where a separate reaction zone 21 is used the dry reaction product vapors and dry powdered catalyst pass overhead through line 26 to separating means 25.

Where the bottoms from product fractionator 11 in line 15 are at a sufficiently high temperature and a sufficient amount of hot catalyst from standpipe 16 is used, the heating zone 19 may be omitted and the bottoms fraction and powdered catalyst passed through line 27 around heating zone 19 into line 20 directly into reaction zone 21.

Separation means 25 is shown as a cyclone separator, but other separating means may be used and more than one cyclone separator may also be used if desired.

Vapors containing entrained catalyst which is not removed in the separating means 25 pass overhead through line 28 and are introduced into product fractionator through line 12 as described above.

Separated catalyst is collected in the bottom of 29 of separating means 25 and introduced into standpipe 30 provided with manifold 31 having branch aerating lines 32 and control valve 33. Catalyst from standpipe 30 is mixed with regenerating gas, such as air, introduced through line 34 and the mixture passed through line 35 into the bottom of a regeneration zone 36 having a bottom grid member 37. The grid member acts to distribute evenly the powdered material and gases across the area of the regeneration zone 36. The regeneration zone has a much greater diameter than the diameter of the pipe 35 and because of this increase in diameter there is a decrease in the velocity of the gases passing through the regeneration zone 36. The velocity of the gases passing through regeneration zone 36 is so selected that the powdered catalyst assumes the appearance of a boiling liquid having a level 38. The powdered catalyst is in a turbulent condition and good mixing is effected so that the temperature during regeneration is substantially uniform throughout the fluidized mixture in the regeneration zone.

Regenerated powdered catalyst and regeneration gases pass overhead through line 39 to a separating means 40 which is shown as a cyclone separator in the drawing, although other separating means may be used as desired. Also a Cottrell precipitator may be used as a final separating means to separate substantially all of the powdered catalyst from the regeneration gases so that the regeneration gases passing out of the separating means 40 through line 41 are substantially devoid of any catalyst fines. Separated regenerated catalyst is collected in hopper 42 of separating means 40 from which it passes to standpipe 16. The standpipe 16 is provided with a manifold 43 having branch lines 44 for introducing aerating gases into the standpipe to maintain the regenerated catalyst in fluidized condition so that a hydrostatic pressure is developed at the bottom of the standpipe. The regenerated catalyst is fed into line 15 as described above. A portion of the catalyst may be passed through branch line 16' so as to bypass heater 19.

Referring more particularly to Figure 2, the greater portion of reflux condensate and unvaporized constituents of residual oil introduced into product fractionator 11 are removed from tray 45 which is placed above the point at which cracked vapors are introduced into the tower 11 through line 12, while only a heavy tar is removed through line 15 from the bottom of tower 11. The mixture of unvaporized constituents and reflux condensate removed from tray 45 is passed through line 46 to filtering unit 47 where salt and other inorganic materials are removed from the oil. However, instead of using a filter for desalting, any other suitable desalting device may be employed such as settling under pressure in the presence or absence of alkalies. The residual oil removed from the tower through line 15 contains all the catalyst introduced by the vapors entering through line 12. This residue may be treated in any desired manner, such as filtering for recovering the catalyst. The recovered catalyst may then be picked up by fresh feed entering the system through line 49.

In addition to the side stream of reduced crude removed from plate 45 a side stream of recycle gas oil may be removed from plate 51 and passed directly to reactor 21 through line 52.

Since a temperature of about 200–400° F. is necessary for filtering, it is evident that due to the contacting of the residual oil from tower 11 with cracked vapors from the cracking unit, the oil has been heated well above this temperature by direct heat transfer. Furthermore, the oil has been dehydrated, a necessary operation for desalting by filtering. Moreover, the presence of reflux condensate in the residual oil reduces its viscosity so that lower filtering temperatures may be used. After passing through the filtering unit 47, the mixture of reduced crude and reflux condensate is carried by line 48 and introduced into line 52 carrying recycle gas oil withdrawn from the plate 51 of tower 11. The mixture of reflux condensate from line 48 and recycle gas oil from tower 11 are then passed through heating coil 18 in heating zone 19 into reactor 21 as described above with reference to Figure 1.

In either of the embodiments shown in Figures 1 and 2, a light gas oil fraction may be withdrawn near the top of fractionator 11 through line 14 and introduced into oil flowing through line 52 and passed to the catalytic cracking unit. Likewise a virgin gas oil may be introduced into line 52 through line 49.

A specific example of catalytic conversion of heavy hydrocarbon oil will now be given, but it is to be understood that the example is by way of illustration only and the invention is not to be limited to the specific example.

A crude oil, such as an East Texas crude, having an A. P. I. gravity of 37.5° is introduced into product fractionator 11 through line 10 and heat exchanger 53. Cracked vapors from the catalytic cracking unit are introduced into fractionator 11 through line 12 near the bottom. The temperature of these cracked vapors is about 950° F. and contain catalyst particles which have not been completely removed in the separating means of the catalyst unit. Gasoline is removed from product fractionator 11 through line 13, and a light gas oil fraction boiling between 450 and 600° F. is removed through line 14.

A bottoms fraction containing unvaporized constituents in the residual oil and reflux condensate produced in fractionator 11 is removed as in Figure 1 through line 15 and mixed with regenerated catalyst from standpipe 16. This catalyst may be any suitable cracking catalyst, such as an acid treated bentonitic clay, synthetic silica alumina gels or silica magnesia gels. The catalyst is of a size between about 300 and 400 standard mesh and finer, although catalyst with up to 60% retained on 100 mesh may be used. The bottoms fraction passing from the bottom of fractionating tower 11 through line 15 is at a temperature of about 500–650° F. More than about three parts of catalyst by weight to one part of oil by weight is used as for example 10 to 30 parts of catalyst to one part of oil. The residual oil and reflux condensate mixture from the bottom of tower 11 is heated by mixture with a hot regenerated catalyst from standpipe 16 to a temperature of about 900–1050° F., and the residual oil and reflux condensate are maintained in reaction zone 21 at this temperature in the presence of a catalyst for about 0.5–2.0 minutes to effect the conversion of the oil to gasoline, gas oil and coke which is deposited on the catalyst. When the reduced crude, introduced into fractionator 11 through line 10, contains appreciable amounts of inorganic material, such as salt, the bulk of the unvaporizable constituents from 11 is removed as in Figure 2 from tray 45 through line 46 and, if desired, may be cooled to a temperature of around 500° F. by means of cooler 50. The cooled mixture is then desalted as by filtering in 47 at about 200–400° F. The desalted material is passed by line 48 to line 52 and thence to reactor 21. A recycle gas oil is removed from tower 11 through line 52 and passed directly to reactor 21.

From the above it will be seen that this invention contemplates the use of a residual stock containing non-vaporizable constituents as a feed stock for a catalytic cracking operation. In this operation a sufficient amount of catalyst is used to adsorb the liquid and sufficient heat is supplied either by the powdered catalyst itself or by heating means, to vaporize and convert the residual oil to vapors and coke or carbonaceous material, so that the mixture of residual oil and catalyst, after mixing and heating, forms a mixture which can be passed through pipes or vessels as a suspension.

An important feature of this invention is the recycle cracking of the condensed heavy gas oil from the fractionator 11 with the residual oil. Where 6–7% carbon results when the residual oil is processed alone to give 45% gasoline, recycling of the gas oil to as much as ½ part gas oil to 1 part of residual oil results in reduction of the carbon yield by 1 to ½% of fresh feed for the same gasoline yield, other operating conditions being the same. At the same time somewhat more gas oil is recovered from tower 11 through line 14 and it has about 2° A. P. I. higher gravity. In the operations illustrated, the amount of recycle is controlled by the cracking temperature, the catalyst to oil ratio to the reactor, the amount of catalyst in the reactor, and the activity of the catalyst.

Instead of using the type of vessel or reaction zone shown in the drawings where the reaction products or gases and powdered catalyst pass overhead, there may be used reaction zones or vessels including regeneration zones or vessels where the vapors or gases pass overhead with a small amount of entrained catalyst but the bulk of the catalyst is taken off from the bottom of the reaction zones and introduced into a standpipe associated with the respective zones from which it is circulated to another part of the process.

Although the present invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed.

This application describes an improvement over the invention described and claimed in the Tyson application Serial No. 470,737, filed December 31, 1942.

The nature and objects of the present invention having thus been set forth and specific embodiments of the same illustrated, what is claimed as new and useful and desired to be protected by Letters Patent is:

1. In a process for cracking salt-containing crudes; the improvement which comprises introducing said salt-containing crude into an upper intermediate point in a fractionating zone, separately introducing hot cracked vapor products into the bottom portion of said fractionating zone, separately collecting a fraction comprising unvaporized salt-containing crude and a light condensate obtained from said vapors at an upper point in said fractionating zone but below the point of introduction of said reduced crude, filtering the fraction so collected to remove salt therefrom, separately collecting an intermediate condensate fraction at a lower point in said fractionating zone, removing the intermediate fraction so collected, separately collecting an initial heavy condensate fraction in the bottom portion of said fractionating zone, separately withdrawing said heavy condensate fraction so collected, combining said intermediate fraction with the filtered fraction, subjecting the resulting mixture to cracking in the presence of an active cracking catalyst at cracking temperature for a period sufficient to convert a substantial portion of said mixture into gasoline and introducing the resulting hot cracked vapor products into the fractionating zone as aforesaid.

2. In a process for cracking salt-containing reduced crudes; the improvement which comprises introducing said salt-containing reduced crude into an intermediate point in a fractionating zone, separately introducing a stream of hot cracked vapor products into said fractionating zone below the point of introduction of said reduced crude, removing vapors comprising gasoline and uncondensed gases from the upper end of said fractionating zone, separately collecting a fraction consisting of unvaporized salt-containing reduced crude and an intermediate condensate from said vapors at a point below the point of introduction of said reduced crude, withdrawing the fraction so collected from said fractionating zone, filtering said fraction to remove salt therefrom, separately collecting a second fraction comprising a condensate heavier than said intermediate condensate within said fractionating zone, withdrawing the heavier condensate fraction so collected from the fractionating zone from a point intermediate the points of introduction of cracked vapor products and withdrawal of said first mentioned fraction and adding it to said filtered fraction, subjecting said combined heavier condensate and filtered fractions to cracking in the presence of a catalyst at a temperature and for a period sufficient to convert a substantial portion thereof into gasoline constituents and passing the resulting hot cracked vapor products into said fractionating zone as aforesaid.

CHARLES E. HEMMINGER.

REFERENCES CITED

The following references are of record in the file of this patent:

UNITED STATES PATENTS

| Number | Name | Date |
| --- | --- | --- |
| 2,247,126 | Hemminger | June 24, 1941 |
| 2,268,094 | Russell | Dec. 30, 1941 |
| 2,312,681 | Teter | Mar. 2, 1943 |
| 2,327,175 | Conn | Aug. 17, 1943 |
| 2,328,325 | Butikofer | Aug. 31, 1943 |
| 1,982,462 | Alther | Nov. 27, 1934 |
| 2,366,792 | Kirkbride | Jan. 9, 1945 |
| 1,965,168 | Alther | July 3, 1934 |
| 2,273,075 | Weems | Feb. 17, 1942 |

OTHER REFERENCES

Desalting Crude Oils by Gustav Egloff et al., Am. Inst. of Mining and Met. Technical publication No. 916, 20 pages Petroleum Technology May 1938. (Copy in 252–328.)